April 3, 1934. J. S. PARSONS 1,953,126
NETWORK SYSTEM OF DISTRIBUTION
Filed July 30, 1932 7 Sheets-Sheet 1

WITNESSES:
Fred C. Wilham

INVENTOR
John S. Parsons
BY
ATTORNEY

April 3, 1934. J. S. PARSONS 1,953,126
NETWORK SYSTEM OF DISTRIBUTION
Filed July 30, 1932 7 Sheets-Sheet 5

WITNESSES:

INVENTOR
John S. Parsons
BY
ATTORNEY

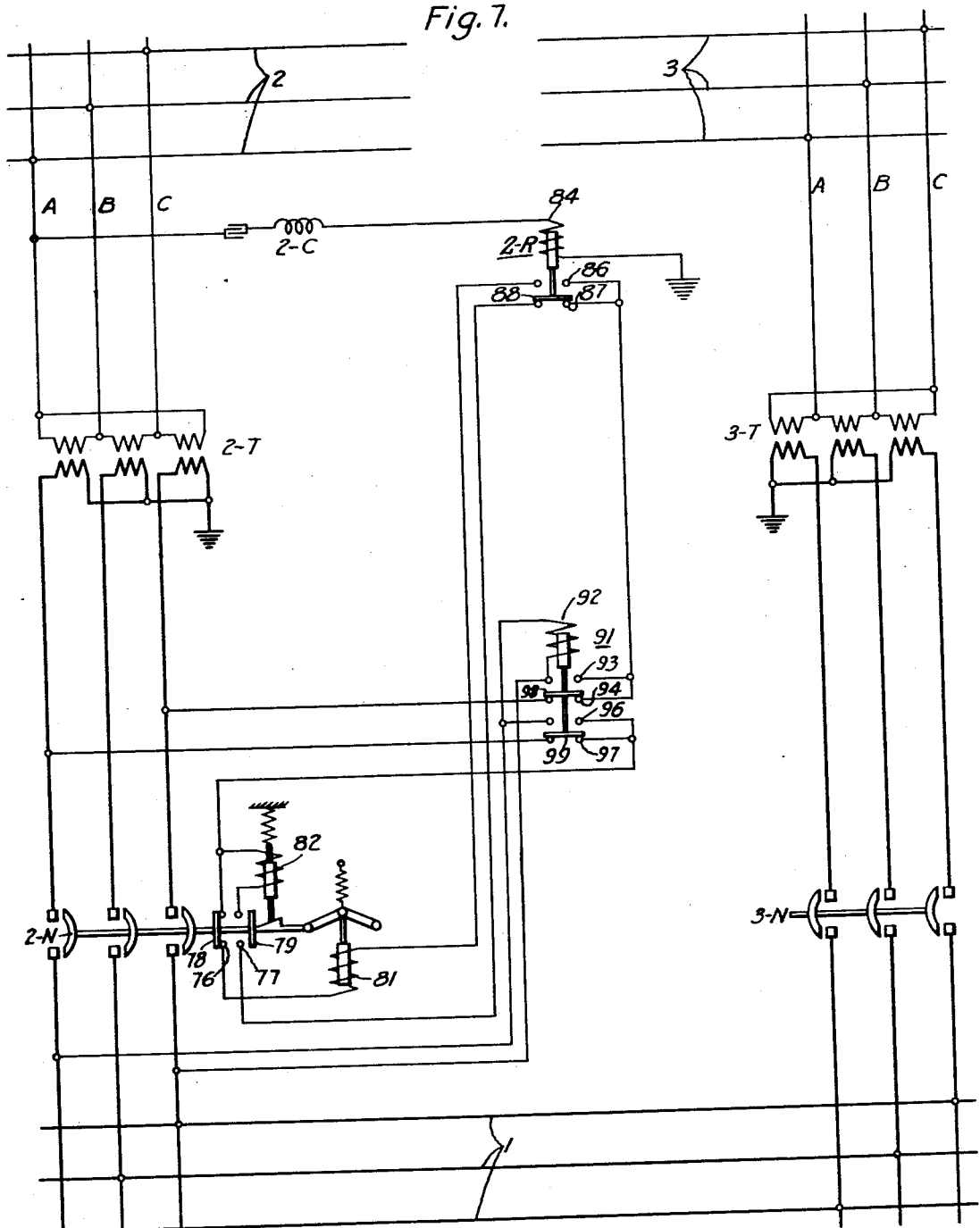

Patented Apr. 3, 1934

1,953,126

UNITED STATES PATENT OFFICE 1,953,126

NETWORK SYSTEM OF DISTRIBUTION

John S. Parsons, Swissvale, Pa., assignor to Westinghouse Electric & Manufacturing Company, East Pittsburgh, Pa., a corporation of Pennsylvania Application July 30, 1932, Serial No. 627,080

13 Claims. (Cl. 171—97)

The present invention relates to alternating-current network systems of distribution and a simplified control and protective means therefor.

A typical alternating-current network, of the type contemplated in the present invention, comprises a network load circuit, adapted to supply load to consumers at a proper utilization voltage, and feeder circuits associated with such network load through distribution or step-down transformers. Overload circuit breakers are usually placed in the respective feeder circuits at the station or bus end thereof and network circuit breakers are interposed between the distribution transformers and the network load circuit.

The control of the network circuit breakers should, preferably, be fully automatic in view of the frequent disadvantageous physical location of many of the distribution transformer and network circuit breaker unit installations. In many instances, the network transformer and network circuit breaker, together with proper relay control apparatus, are placed in underground vaults or manholes in the city streets, with the result that it becomes too uneconomical, from the central station operator's standpoint, to provide manual control for such network units at any time.

Many relay control and protective systems have been suggested and incorporated in existing network systems and it is an object of the present invention to provide a simplified system of control and protection for such alternating-current network systems of distribution, such control system to be fully and properly operative under all possible conditions existing upon the network system.

Another object of the present invention is to provide a control means for an alternating-current network system of distribution which will effectively differentiate between faults on the feeder circuit or in the network transformer and small reversals of power or power flow from the network load circuit to the feeder circuit as a result of fluctuating loads or poor regulation.

Another object of the present invention is to provide a high-frequency control means which is operative to effect the full automatic control of the network circuit breakers included in an alternating-current network system of distribution.

Another object of the present invention is to provide a high-frequency scheme of control for network circuit breakers such that a network load circuit may be supplied with power from the same source or from a plurality of sources.

Another object of the present invention is to effect a pronounced simplification in the type of control relays per se associated with the network circuit breakers.

A further object of the present invention is to provide an automatic control means for network circuit breakers such that the opening and closing of the network circuit breakers may be controlled at will by a central station operator.

A further object of the present invention is to apply other-than-normal frequency control currents to the feeder circuit when the feeder circuit breaker is closed to close and maintain the associated network circuit breakers closed.

A further object of the present invention is to effect the disconnection of any feeder circuit and associated network transformers from the network load circuit upon the failure or removal of the other-than-normal frequency source associated with such feeder circuit.

A further object of the present invention is to effect the disconnection of any feeder circuit and associated network transformers from the source or bus upon the failure or removal of the other-than-normal frequency source associated with such feeder circuit.

A further object of the present invention is to apply other-than-normal frequency currents to the feeder circuit supplying power to a network load circuit and to effect the automatic control of the network circuit breakers by means of relay apparatus tuned to such other-than-normal frequency currents.

A further object of the present invention is to apply an other-than-normal frequency supply to the feeder circuits supplying power to a common network load circuit and to limit the other-than-normal frequency currents to the particular feeder or feeders on which they are applied when the particular network system would be adversely affected by the application of such other-than-normal frequency currents to all parts of the system.

Further objects and advantages of the present invention will become more readily apparent from a detailed consideration of applications of the proposed control scheme in conjunction with a typical alternating-current system of distribution.

For better clarity in understanding the application and operation of the present invention with respect to alternating-current network systems of distribution, reference will be made to the several drawings, wherein.

Figure 2:
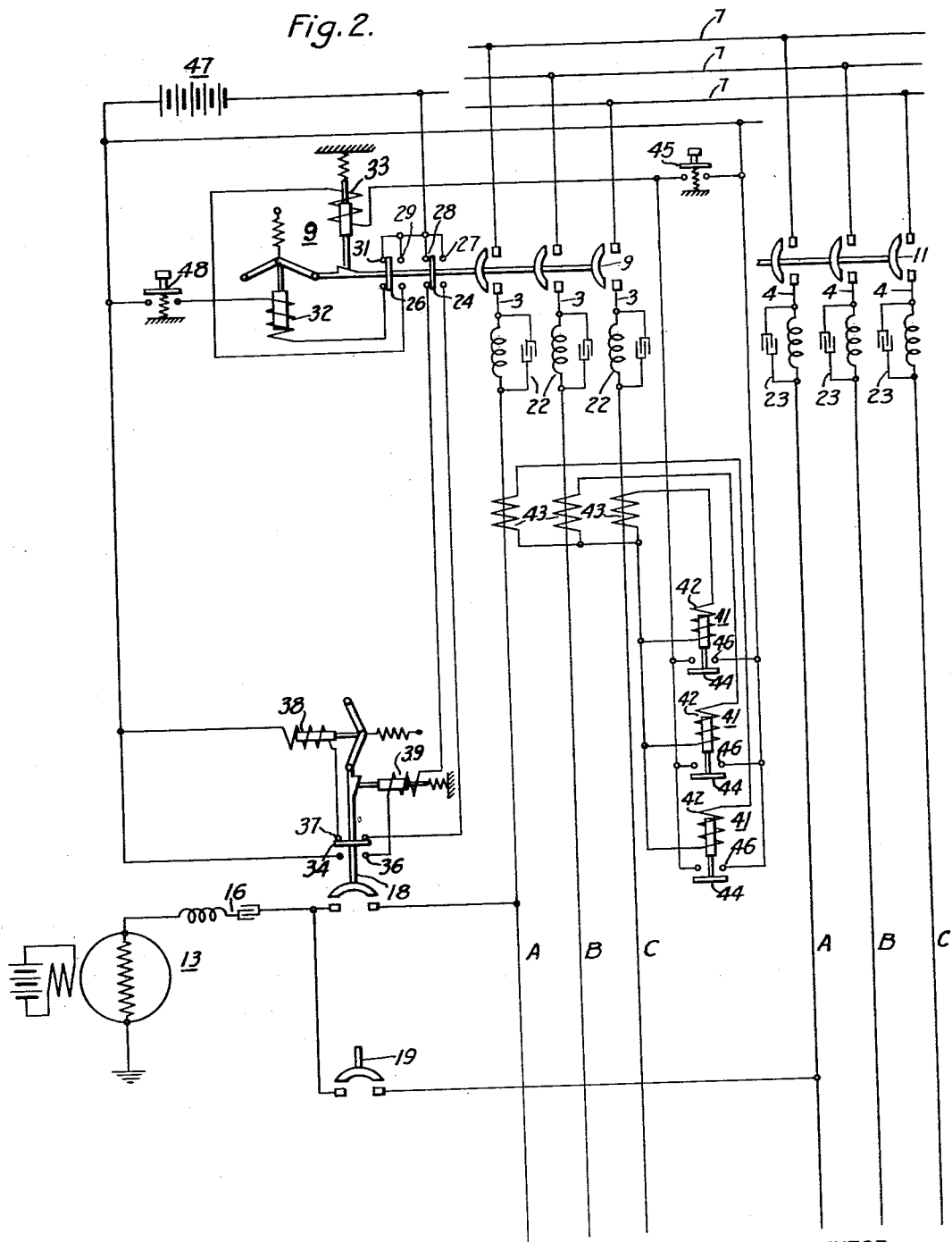
Fig. 2 illustrates schematically a means of applying the superimposed frequency upon a feeder circuit at the source end thereof.
Figure 4:
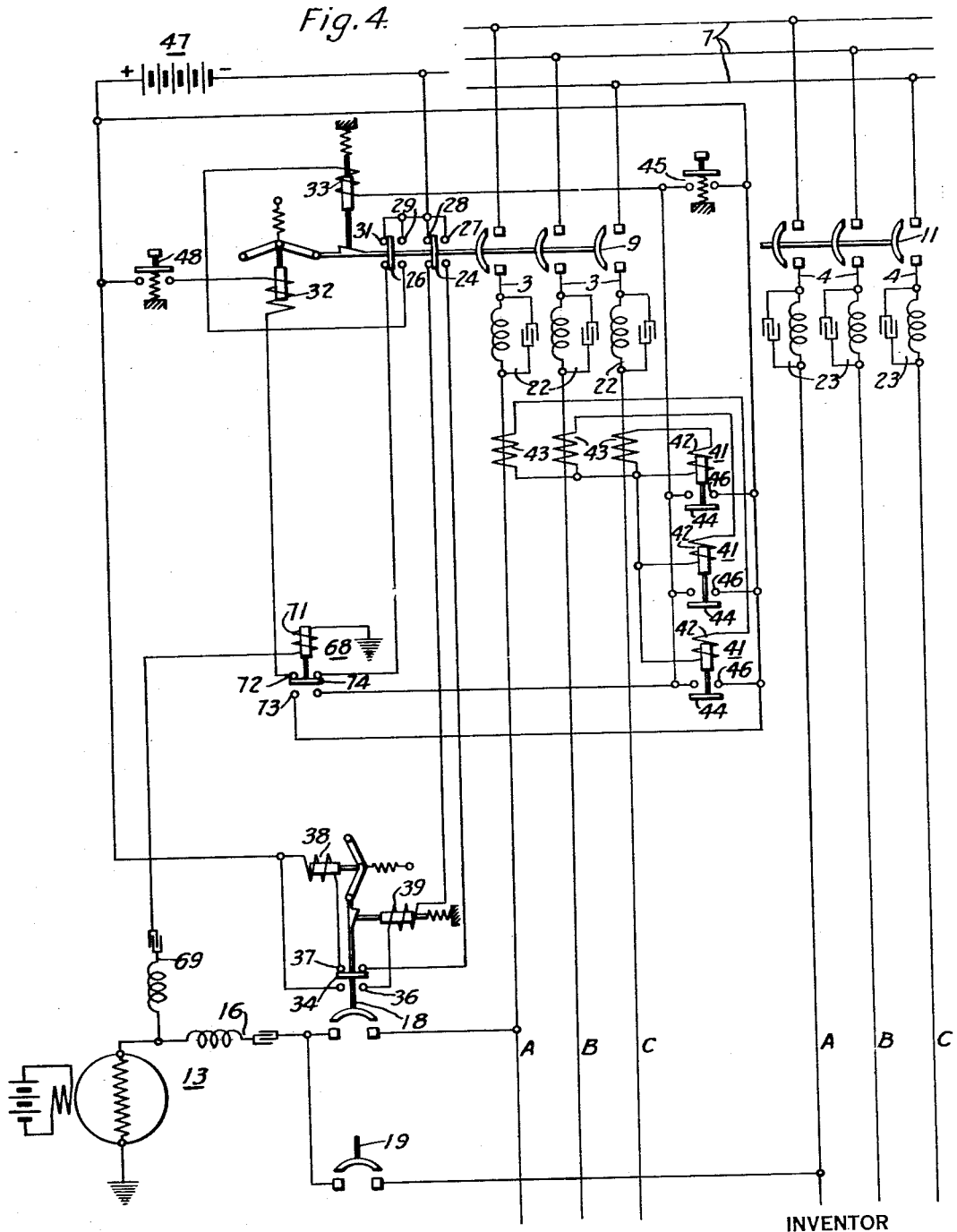

Fig. 4 corresponds to the control scheme illustrated in Fig. 2 and includes an arrangement for isolating a feeder circuit from its associated source upon the failure or removal of the other-than-normal frequency source associated with such feeder circuit.

Figure 3:
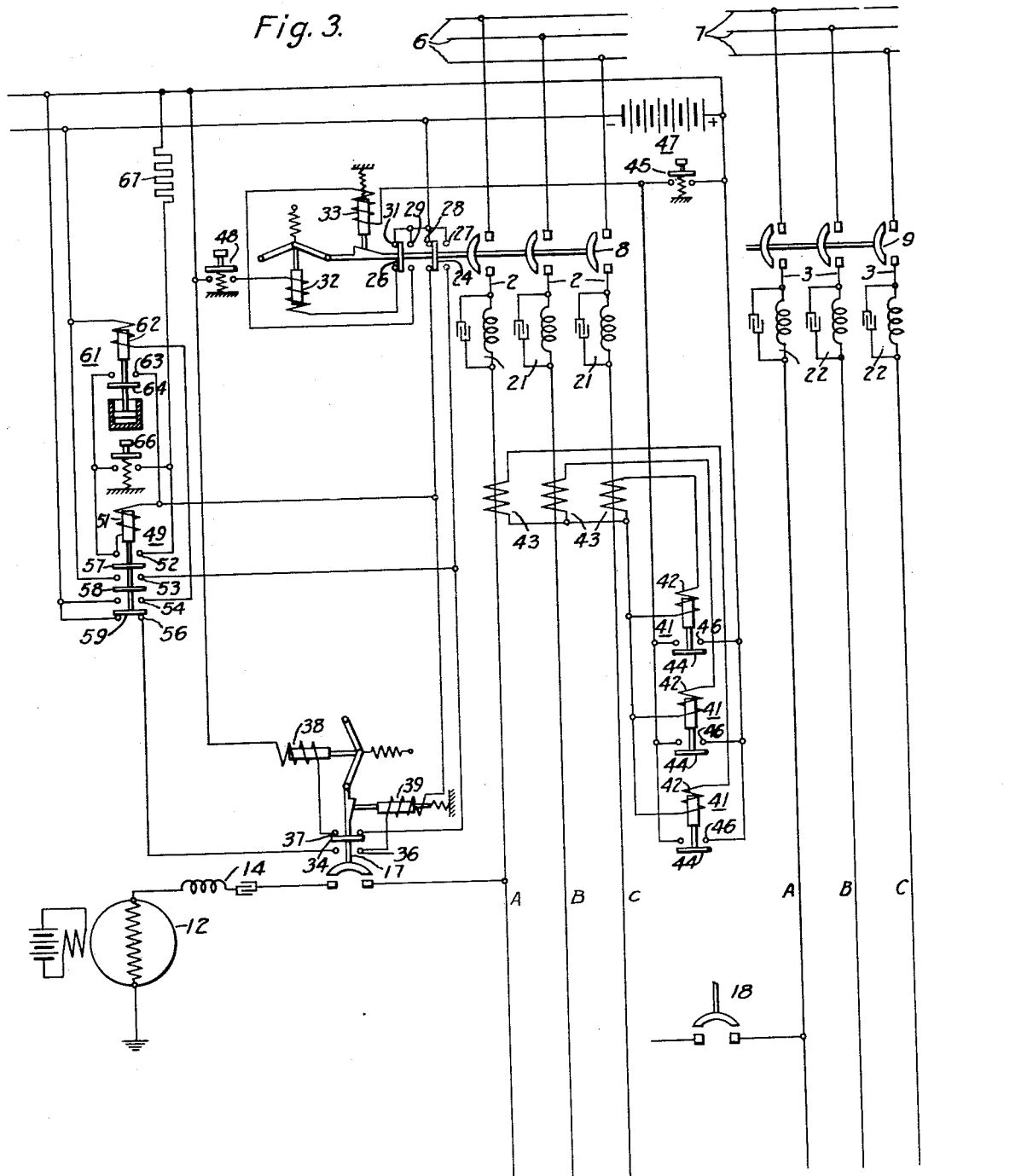
Fig. 3 is a schematic diagram of a preferred means for applying a superimposed frequency upon the source end of a feeder circuit in an alternating-current network system of distribution, wherein the network load circuit is supplied with power from a plurality of feeders energized from different sources.
Figure 5:
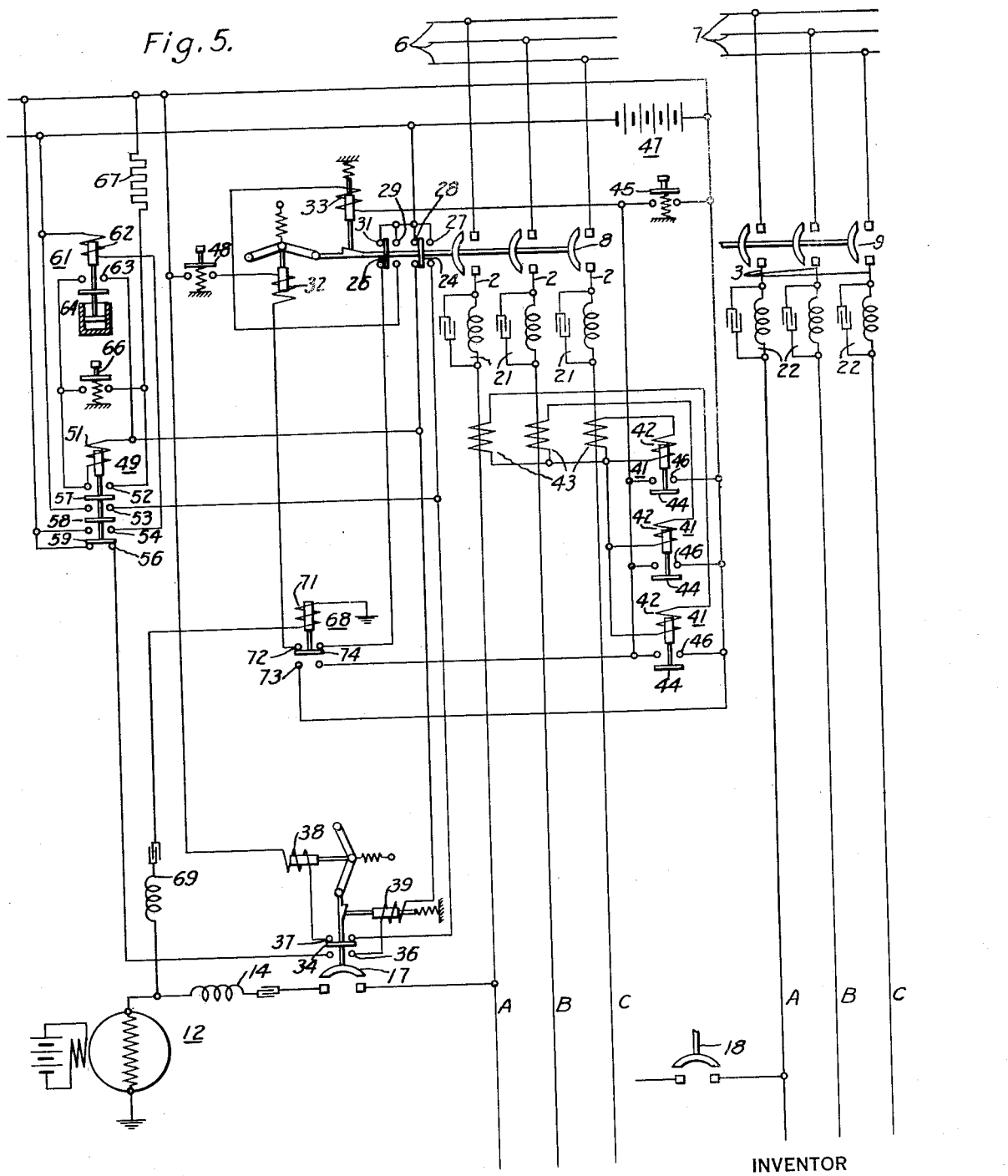

Fig. 5 corresponds to the control scheme illustrated in Fig. 3 and includes an arrangement for isolating a feeder circuit from its associated source upon the failure or removal of the other-than-normal frequency source associated with such feeder circuit.

Figure 6:
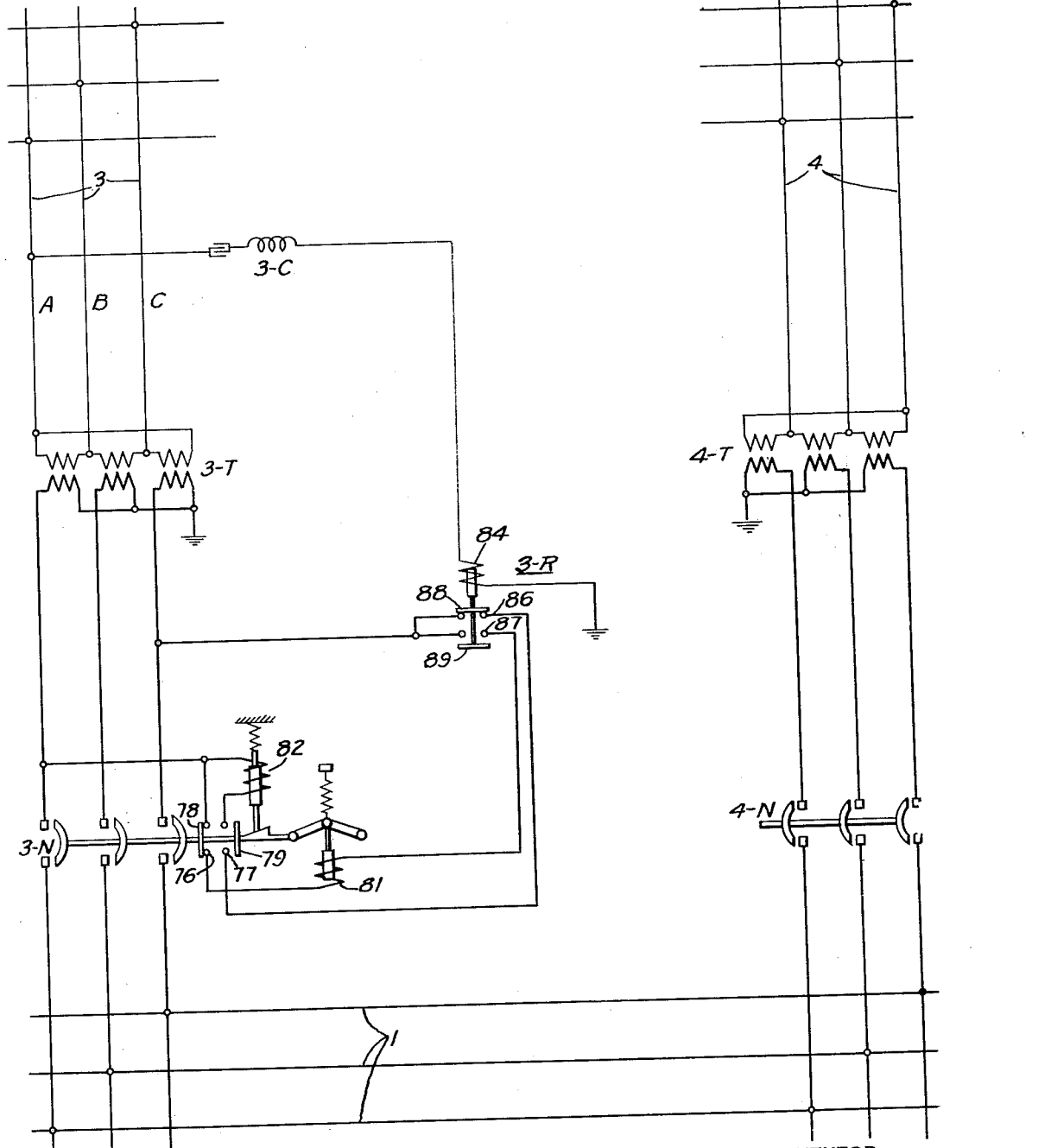

Fig. 6 illustrates the simple relay control arrangement utilized in conjunction with the network circuit breakers.

Fig. 7 illustrates the relay control arrangement utilized in conjunction with a network circuit breaker in an alternating-current network system of distribution wherein the network load circuit is supplied with power from a plurality of feeder circuits energized from different sources.

Figure 1:
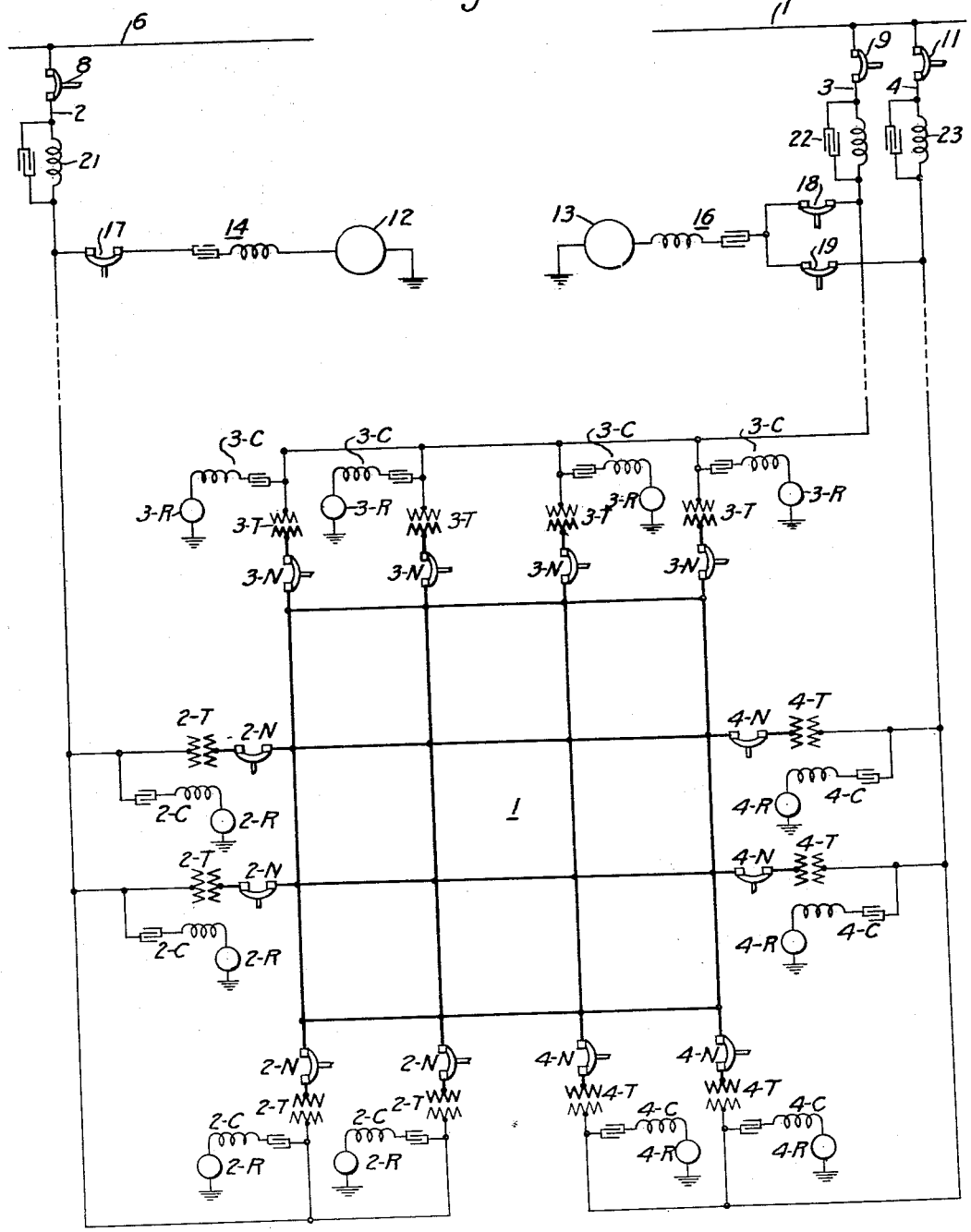
Figure 1 is a schematic single-line diagram of an alternating-current system of distribution and a superimposed frequency scheme of control and protection for the network circuit breakers.

Referring to Fig. 1, the general operation of a network system of distribution employing a superimposed frequency-control scheme of the type contemplated in the present invention will be described. A network load circuit 1, represented schematically as a grid or interlaced secondary network, is adapted to be supplied with power from a plurality of feeder circuits 2, 3 and 4. The feeder circuit 2 is adapted to be energized from a central station or bus 6, while the feeder circuits 3 and 4 are adapted to be energized from a second source or bus 7. Obviously, the respective feeder circuits 2, 3 and 4 may be energized from the same source or bus and are shown connected to be energized from different sources in order to provide a generic showing of a typical network system of distribution. A plurality of distribution or network transformers are associated with each of the feeder circuits 2, 3 and 4, respectively, and feeder circuit breakers 8, 9 and 11 are associated with the source or bus ends of the respective feeders 2, 3 and 4.

The network transformers associated with the respective feeder circuits are indicated by the reference numeral of the associated feeder circuit and the letter T, thereby providing proper indication for the source of supply of the respective transformers. The network circuit breakers are indicated in a similar manner, the numeral of the associated feeder circuit being employed in conjunction with the letter N.

For the purpose of explaining the function and mode of operation of the present invention, it will be assumed that the other-than-normal frequency current sources are high-frequency generators associated with the respective feeder circuits. For the purpose of applying or superimposing the high-frequency currents upon the network system, suitable high-frequency generators 12 and 13 are associated with the respective feeder circuits 2 and 3, 4. These high-frequency generators are shown grounded on one side and the other side is connected to the respective feeder circuits through suitable tuned circuits 14 and 16 and circuit breakers 17 and 18, 19, respectively. The respective tuned circuits 14 and 16 comprise series-connected inductances and capacitances which are so arranged to offer a minimum impedance to the flow of high-frequency currents from the sources 12 and 13 and a maximum or high impedance to the flow of normal frequency currents in the feeders 2, 3 and 4.

The feeder circuit breakers 8, 9 and 11 are disposed at the source ends of the respective feeders 2, 3 and 4 and on the network or transformer side of such circuit breakers, parallel tuned circuits 21, 22 and 23 are inserted for the purpose of offering a minimum impedance to the flow of normal frequency currents and a maximum or high impedance to the flow of the high-frequency currents generated by the respective high-frequency generators 12 and 13. These choke or tuned circuits, comprising parallel-connected capacitances and reactors, may not be necessary in all network systems, particularly in systems wherein all of the feeder circuits are supplied from the same source or bus. However, in many network systems wherein the network load circuit is supplied with power from a plurality of feeder circuits energized from different sources or buses, it may be advisable to utilize such tuned circuits in the feeder circuits so as to obviate any possible objections arising from the application of the high-frequency currents to other parts of the network system.

At the network load end of the respective feeder circuits no tuned circuits have been illustrated in the respective feeder circuits and such circuits are unnecessary when the distribution transformers are delta-star connected. Inasmuch as a large portion of the distribution or network transformers in existing network systems are delta-star connected, it may never be necessary to provide such tuned circuits in the feeder circuits. However, in the event that star-star connected transformers are utilized, it would be advisable to provide tuned circuits at the network end of the respective feeder circuits in a manner similar to the tuned circuits 21, 22 and 23 illustrated in such feeder circuits at the source or bus ends thereof.

In conjunction with the network transformers and network circuit breakers, suitable relay control means is provided for effecting the full automatic operation of such network circuit breakers. This relay control apparatus has been indicated schematically as comprising high-frequency relays associated with the feeder circuits through tuned circuits corresponding to the tuned circuits 14 and 16 associated with the high-frequency generators 12 and 13. The high-frequency relays are designated by the reference numeral of the associated feeder circuit and the letter R and the respective tuned circuits, associated with such relays, are designated by the reference numeral of the associated feeder circuit and the letter C.

The general operation of the network illustrated in Fig. 1 and the function of the control apparatus associated therewith will now be considered. Assuming the network load circuit 1 to be deenergized and the feeder circuit breakers 8, 9 and 11 to be in their open positions, all of the network circuit breakers 2N, 3N and 4N will also be in their open positions and the feeder circuits will be entirely deenergized and isolated from both the sources or buses 6 and 7 and the network load circuit 1.

Now assuming that it is desired to energize the network load circuit 1 from one of the feeder circuits, the central station operator closes the circuit breaker 9, associated with the feeder circuit 3, thereby energizing the primary windings of the network transformers 3—T. Upon the closing of the circuit breaker 9, the circuit breaker 18 is automatically closed to connect the high-frequency generator 13 to the feeder circuit 3 and high-frequency currents are supplied to this feeder circuit. A circuit, therefore, may be traced from ground through the high-frequency generator 13, tuned circuit 16, circuit breaker 18, feeder circuit 3, tuned circuits 3C, the high-frequency relays 3R and back to ground. The high-frequency generators 12 and 13 are kept running at all times, and, therefore, it is unnecessary to start such generators each time any of the feeder circuit breakers are actuated to their closed positions.

The closing of the circuit breaker 18 applies the high-frequency currents to the feeder circuit 3 with the result that the high-frequency relays 3R are energized to effect the closing of the network circuit breakers 3N. Since the high-frequency relays 3R are controlled exclusively by the high-frequency currents supplied from the high-frequency generator 13, such relays are effective to maintain the network circuit breakers 3N in their closed position during the continued application of the high-frequency currents.

Now assuming a fault or predetermined abnormal current condition to occur on the feeder circuit 3 or in any of the associated network transformers, the feeder circuit breaker 9 is actuated to its open position, by suitable overcurrent relays, thereby disconnecting the feeder circuit 3 from the source or bus 7. The opening of feeder circuit breaker 9 completes an energizing circuit for the tripping coil of circuit breaker 18 and the breaker 18 is automatically actuated to its open position thus disconnecting the high frequency generator 13 from the feeder circuit 3.

Since the high frequency relays 3—R are responsive to only the other-than-normal frequency currents, the removal of such control currents from the feeder circuit 3 results in the deenergization of relays 3—R and the consequent opening of the network circuit breakers 3—N. The feeder circuit 3 is, therefore, isolated from both its associated bus or source 7 and the network load circuit 1 upon the occurrence of a fault or predetermined abnormal current condition on the feeder.

In the present embodiment of the invention, the other-than-normal frequency control currents are superimposed on only one phase of a three-phase feeder. It follows, therefore, that in the event of a ground fault occurring on the phase to which such control currents are applied, a second circuit is completed for the high-frequency currents from the high-frequency generator 13 to such ground fault. This diversion of the normal flow of high-frequency currents may result in the effective deenergization of the high-frequency relays 3—R with the result that the network circuit breakers 3—N are actuated to their open positions and the feeder circuit 3 is isolated from the network load circuit 1.

Assuming now that the network load circuit 1 is energized by the feeder circuit 3 through the respective network transformers 3—T and it is desired to connect a second feeder circuit to the network load circuit 1, the central station operator effects the closing of the circuit breaker 11, associated with the feeder circuit 4, thereby energizing the primary windings of the network transformers 4—T. Upon the closing of the circuit breaker 11, the circuit breaker 19, associated with the high-frequency generator 13, is actuated to its closed position to thereby impress the high-frequency currents upon the feeder circuit 4 and complete a circuit for such high-frequency currents from ground through the high-frequency generator 13, tuned circuit 16, circuit breaker 19, feeder circuit 4, tuned circuits 4—C, the high-frequency relays 4—R, and thence to ground.

The relays 4—R are thereby energized to effect the closure of their associated network circuit breakers 4N and the feeder circuit 4 is connected to the network load circuit 1 and supplies power thereto in parallel with the feeder circuit 3. The operation of the feeder circuit breaker 11 and the network circuit breakers 4—N is substantially similar to the operation of the corresponding circuit breakers associated with the feeder circuit 3 and a description of such operation is, therefore, deemed unnecessary.

Assuming, however, that it is desired to connect a feeder circuit to the network load circuit 1, when such feeder circuit is energized from a different source or bus than the feeder circuits supplying power to the network load circuit, a different sequence of operation of the control apparatus is required. For example, assuming the network load circuit 1 to be energized by the feeder circuits 3 or 4 and that it is desired to connect the feeder circuit 2 to the network load circuit 1, the following sequence of operation is necessary and is provided by the control apparatus of the present invention.

The feeder circuit breaker 8 is in its open position and the network circuit breakers 2—N are also in their open position. The central station operator effects the closure of the circuit breaker 17, thereby impressing the high-frequency currents provided by the high-frequency generator 12 upon the feeder circuit 2 and the high-frequency relays 2—R, associated with the feeder circuit 2, are energized to effect the closure of their associated circuit breakers 2—N. The energizing circuit for the high-frequency relays 2—R is completed from ground through the high-frequency generator 12, tuned circuit 14, circuit breaker 17, feeder circuit 2, tuned circuits 2—C, the high-frequency relays 2—R and thence to ground. In this manner, the network circuit breakers 2—N are actuated to their closed position and a voltage corresponding to the network load circuit voltage exists on the transformer side of the feeder circuit breaker 8.

The central station operator thereupon effects a synchronizing action between this voltage on the transformer side of the feeder circuit breaker 8 and the voltage of the source 6 on the other side of the circuit breaker 8. When the two voltages are proper, as regards magnitude and phase position, the central station operator effects the closure of the circuit breaker 8, thereby completing the circuit for the feeder circuit 2 and permitting power to be supplied to the network load circuit 1 from the source or bus 6.

Suitable control apparatus is also associated with the two circuit breakers 8 and 17 to insure that the circuit breaker 8 is closed within a predetermined time after the closure of the circuit breaker 17, in order to obviate the possibility of the high-frequency currents being supplied to the feeder circuit 2 for an indefinite period without the feeder circuit breaker 8 being in closed position. This inter-relation of the position of the circuit breakers 8 and 17 is necessitated in order to preserve the fault-proof character of the control system in determining when the feeder circuit is faulty or the high-frequency supply source is inoperative. The control apparatus, associated with the network circuit breakers 2—N and the feeder circuit breaker 8, functions in a similar manner to the control apparatus associated with the feeder circuits 3 and 4 and the detailed operation thereof will not be considered at the present time.

It may be noted, however, that the present invention may be applied to any type of existing or contemplated network distribution system and will permit a network load circuit to be energized from the same or different sources through proper feeder circuits, at the will of the central station operator, and the control apparatus associated with the respective circuit breakers functions to effect the proper actuation thereof under all conditions existing on the network system. It may also be noted that two different sources may be connected to supply power to the same network load circuit even though the voltage of the network load circuit and the incoming source or bus voltage are unlike in magnitude and phase position. This feature also permits small reversals of power or power flow from the network load circuit to the associated feeder circuits due to fluctuating loads connected to the network load circuit and due to different conditions of voltage regulation on the respective feeder circuits.

From the foregoing general description of the operation of a network distribution system, employing the control means of the present invention, it is apparent that two different schemes for applying the high-frequency currents to the respective feeder circuits may be necessitated in network distribution systems, depending upon whether or not the network load circuit is supplied with power from the same or separate sources. A suitable means for supplying the high-frequency currents to the feeder circuits in a network distribution system wherein the network load circuit is supplied from feeder circuits energized from the same source or bus is shown schematically in Fig. 2 of the drawings. The detailed function and sequence of operation of such control scheme will now be considered.

Fig. 2 illustrates schematically the feeder circuits 3 and 4 supplied from the source or bus 7, as shown in Fig. 1 of the drawings. The circuits in this figure are illustrated as three-phase and the control scheme of the present invention is illustrated as applied to only the feeder circuit 3; however, the control means for the feeder circuit 4 is similar to the control means shown in conjunction with the feeder circuit 3 and the explanation in connection with the mode and sequence of operation of the control means associated with the feeder circuit 3 is the same as for the control means which would normally be associated with the feeder circuit 4.

The circuit breaker 9, associated with the feeder circuit 3, is provided with pallet switches 24 and 26 and stationary contacts 27, 28, 29 and 31. When the circuit breaker 9 is in its open position, the stationary contacts 28 and 31 are adapted to be bridged by the pallet switches 24 and 26, respectively. Upon the closure of the circuit breaker 9, the stationary contacts 27 and 29 are adapted to be bridged by the pallet switches 24 and 26, respectively, and the stationary contacts 28 and 31 are open-circuited. A suitable closing mechanism is associated with the circuit breaker 9 and includes energizing coil 32. The circuit breaker 9 is also provided with a tripping means, the energizing winding therefor being indicated by the reference numeral 33.

The high-frequency generator 13 is illustrated as having a proper field circuit and as being connected to the feeder circuit 3 in series with the tuned circuit 16 through the circuit breaker 18. The circuit breaker 18 is provided with a pallet switch 34 and stationary contacts 36 and 37. When the circuit breaker 18 is in its open position, the stationary contacts 37 are adapted to be bridged by the pallet switch 34 and when the circuit breaker 18 is actuated to its closed position, the stationary contacts 36 are adapted to be bridged by the pallet switch 34. The circuit breaker 18 is also provided with a proper closing and opening mechanism, the closing mechanism including an energizing winding 38 and the tripping mechanism including an energizing winding 39.

Three single-phase over-current relays 41, shown schematically as being of the solenoid type, have the energizing windings 42 thereof connected in series with star-connected current transformers 43 which are associated with the respective phases of the three-phase feeder circuit 3. Each of the over-current relays 41 is provided with a moving contact 44 and stationary contacts 46. In the event of a predetermined magnitude of current flow in the feeder circuit 3 and the secondary windings of the current transformers 43, one or more of the energizing windings 42, of the overcurrent relays 41, will be effectively energized to effect the bridging of their associated stationary contacts 46 by the moving contacts 44. The stationary contacts 46, of the three over-current relays 41, are connected in parallel and one of the parallel connections is electrically connected to the positive terminal of a direct-current source, such as battery 47. The remaining parallel connection of the stationary contacts 46 is electrically connected to one terminal of the energizing winding 33 associated with the tripping or opening mechanism of the circuit breaker 9.

A common electrical connection is made between one of each of the contacts 27, 28, 29 and 31, associated with the circuit breaker 9, and an electrical connection is made from this common connection point to the negative terminal of a direct-current source, such as battery 47. The remaining contact 31 is connected to one terminal of the energizing winding 32, associated with the closing mechanism of the circuit breaker 9, and the remaining terminal of the energizing winding 32 is connected to the positive terminal of the source 47 through a normally open push button arrangement 48. The remaining contact 29 is connected to the remaining terminal of the energizing winding 33, associated with the tripping mechanism of the circuit breaker 9, the other terminal of the energizing winding 33 being connected to one of the parallel connections of the contacts 46 associated with the over-current relays 41.

The remaining contact 28 is connected in series with the energizing winding 39 and one of the stationary contacts 36 associated with the circuit breaker 18. The remaining stationary contact 36 is connected to the positive terminal of the direct current source 47. The remaining stationary contact 27, associated with the circuit breaker 9, is connected in series with the stationary contacts 37 and one terminal of the energizing winding 38, associated with the closing mechanism of the circuit breaker 18, and the remaining terminal of the energizing winding 38 is connected to the positive terminal of the direct-current source 47.

The operation of the control scheme for the various possible system conditions is as follows. Assuming both of the circuit breakers 9 and 11 in the respective feeder circuits 3 and 4 to be in their open positions and the network load circuit, supplied by such feeder circuits, to be deenergized, the central station operator desires to effect the connection of the feeder circuit 3 to the network load circuit, not shown. The operator closes the push button switch 48 to thereby complete a circuit from the positive terminal of the direct-current source 47, through the push button switch 48, energizing winding 32 associated with the closing mechanism of the circuit breaker 9, stationary contacts 31 and pallet switch 26 associated with the circuit breaker 9, and thence to the negative terminal of the direct-current source 47.

This circuit effects the energization of the energizing winding 32 to thereby actuate the circuit breaker 9 to its closed position and such actuation of the circuit breaker 9 effects the opening of the stationary contacts 31 to thereby deenergize the winding 32. A circuit is completed from the negative terminal of the direct-current source 47, through the stationary contacts 27 and pallet switch 24 associated with the circuit breaker 9, stationary contacts 37 and pallet switch 34 of the circuit breaker 18, energizing winding 38 associated with the closing mechanism of the circuit breaker 18, and thence to the positive terminal of the direct-current source 47. The winding 38 is thereby energized to effect the closing of the circuit breaker 18 and such closing of this circuit breaker moves the pallet switch 34 out of engagement with the stationary contacts 37.

It follows, therefore, that upon the actuation of the push button switch 48, by the central station operator, both the circuit breakers 9 and 18 are actuated to their closed positions. As referred to hereinbefore, the closing of the circuit breaker 9 energizes the feeder circuit 3 and effects the energization of the primary windings of the network transformers associated therewith, and the closing of the circuit breaker 18 results in the application of the high-frequency current supplied by the generator 13 to the feeder circuit 3 through the tuned circuit 16.

Under the assumed conditions, the feeder circuit 3 is now connected to the network load circuit and is adapted to supply power thereto, the high-frequency relays at the network end of the feeder circuit 3 having been effective to actuate the network circuit breakers to their closed positions in response to the application of the high-frequency currents to the feeder circuit 3 from the generator 13. Should it be necessary or advisable to connect a second feeder circuit to the network load circuit, the central station operator may effect the connection of the feeder circuit 4 to such load circuit in a manner similar to the connection of the feeder circuit 3, as hereinbefore explained. In this connection, it should be remembered that the circuit breaker 11 and the circuit breaker 19 are inter-associated in a manner similar to the association of the circuit breakers 9 and 18. Since the high-frequency generator 13 is adapted to run at all times, either of the feeder circuits 3 or 4 could be connected to the network load circuit at the will of the central station operator.

Assuming a fault condition to occur on the feeder circuit 3, such that a predetermined magnitude of current flows in such feeder circuit and that such magnitude of current is of sufficient value to actuate the over-current relays 41, associated with the feeder circuit 3 by means of the current transformers 43, one or more of the relays 41 would have the windings 42 thereof effectively energized to bridge one or more of the stationary contacts 46 by means of the moving contacts 44. Upon the bridging of any one of the contacts 46 by the moving contact 44, an energizing circuit is thereby completed for the winding 33 associated with the tripping or opening mechanism of the circuit breaker 9. This energizing circuit may be traced from the positive terminal of the direct-current source 47, through one or more of the sets of stationary contacts 46 and moving contacts 44 of the over-current relays 41, energizing winding 33 associated with the tripping mechanism of the circuit breaker 9, stationary contacts 29 and pallet switch 26 of the circuit breaker 9, and thence to the negative terminal of the direct-current source 47. The winding 33 is, therefore, effectively energized to actuate the circuit breaker 9 to its open position upon the occurrence of a predetermined magnitude of current flow in the feeder circuit 3.

The opening of the circuit breaker 9 effects the bridging of the stationary contacts 28 by the pallet switch 24 to thereby complete a circuit for the tripping coil 39 associated with the circuit breaker 18. This energizing circuit may be traced from the negative terminal of the direct-current source 47, through stationary contacts 28 and pallet switch 24 of the circuit breaker 9, energizing winding 39 associated with the tripping mechanism of the circuit breaker 18, stationary contacts 36 and pallet switch 34 of the circuit breaker 18, and thence to the positive terminal of the direct-current source 47. The circuit breaker 18 is thereupon actuated to its open position to disconnect the high-frequency generator 13 from the feeder circuit 3.

As explained hereinbefore, the removal of the high-frequency currents from the feeder circuit 3 deenergizes the high-frequency relays at the network load circuit end of the feeder circuit 3, thereby effecting the opening of the network circuit breakers associated with such feeder circuit. The feeder circuit 3 is thereby isolated from both the network load circuit and the source or bus 7 upon the occurrence of a predetermined magnitude of current flow in the feeder circuit 3. The response setting of the over-current relays 41 may be predetermined to insure the actuation of one or more of these relays in the event of fault conditions occurring on the feeder circuit 3 or in its associated network transformers.

It is also apparent that in the event the central station operator deems it desirable to disconnect any feeder circuit from the network load circuit, the feeder circuit breaker 9 may be actuated to its open position manually, thereby resulting in the disconnection of the feeder circuit 3 from the source or bus 7. The manual opening of the circuit breaker 9 is accomplished by the actuation of a push button switch 45, the contacts thereof being connected in parallel with the stationary contacts 46 of the overcurrent relays 41. The feeder circuit breaker 9 is thereupon actuated to its open position and the circuit breaker 18 is automatically opened to disconnect the high frequency generator 13 from the feeder circuit 3. The high frequency relays 3—R are then deenergized and the network circuit breakers 3—N are actuated to their open position, thus isolating the feeder circuit 3 from both the bus or source 7 and the network load circuit 1.

It follows, therefore, that the feeder circuit 3 may be isolated from both the network load circuit and the source or bus 7 upon the occurrence of fault or predetermined over-current conditions existing on the feeder circuit 3 or in its associated network transformer and also in the event that the feeder circuit breaker 9 is manually actuated to its open position by the central station operator.

Referring now to Fig. 3 of the drawings, the preferred control scheme for controlling the feeder circuit breakers and the circuit breakers connecting the high-frequency generators to such feeder circuits in a net work system of distribution, wherein the network load circuit is supplied with power from a plurality of feeder circuits energized from different sources or buses, is illustrated schematically. In this figure, the control scheme asociated with the feeder circuit breaker is substantially the same as the scheme of control illustrated and explained with reference to Fig. 2 of the drawings and similar reference numerals are indicated in both drawings.

Since the operation of the control scheme shown in Fig. 3 is substantially similar to that shown in Fig. 2 when the particular network system of distribution being controlled comprises a network load circuit supplied with power from a plurality of feeder circuits energized from the same source or bus, the sequence of breaker operation and the method of effecting such operation will not be detailed again.

The control scheme is shown associated with the feeder circuit 2 energized from the source or bus 6. The feeder circuit 3, energized from the source or bus 7, is indicated as being available for supplying power to the same network load circuit to which the feeder circuit 2 may be connected. The relay control system for the feeder circuit 3 is not shown, inasmuch as such control is a substantial duplicate of that shown associated with the feeder circuit 2 and the high-frequency generator associated with the feeder circuit 3 is omitted in order to simplify the drawings. The circuit breaker 18, associated with the high-frequency generator 13, which is adapted to supply high-frequency currents to the feeder circuit 3, is indicated on the drawings and the feeder circuit breaker 9 and the tuned circuits or choke 22 is also included in the feeder circuit 3.

Assuming only the feeder circuits 2 and 3 to be associated with a common network load circuit and the respective feeder circuit breakers 8 and 9 in their open positions, the feeder circuit 2 may be connected to the network load circuit in the following manner. The central station operator closes the push button switch 48 to thereby complete an energizing circuit for the winding 32 associated with the closing mechanism of the feeder circuit breaker 8. This energizing circuit may be traced from the positive terminal of the direct-current source 47, through the push button switch 48, winding 32, stationary contacts 31 and pallet switch 26 associated with the circuit breaker 8, and thence to the negative terminal of the direct-current source 47. The feeder circuit breaker 8 is thereupon actuated to its closed position and power is supplied from the source or bus 6 to the primary windings of the network transformers associated with the other end of the feeder circuit 2.

Upon the closing of the feeder circuit breaker 8, an energizing circuit for the winding 38, associated with the closing mechanism of the circuit breaker 17, is completed. This circuit may be traced from the negative terminal of the direct-current source 47, through stationary contacts 27 and pallet switch 24 associated with the circuit breaker 8, stationary contacts 37 and pallet switch 34 of the circuit breaker 17, winding 38, and thence to the positive terminal of the direct-current source 47. The circuit breaker 17 is thereby actuated to its closed position and high-frequency currents are supplied to the feeder circuit 2 from the high-frequency generator 12.

The over-current relays 41 are connected to control the trip coil circuit associated with the feeder circuit breaker 8 in a manner similar to that shown and described with reference to the control scheme of Fig. 2, and the feeder circuit breaker 8 is adapted to be actuated to its open position under similar conditions; namely, fault or predetermined over-current conditions existing on the feeder circuit 2 or in the associated network transformers.

The over-current relays 41 are provided with a predetermined overload setting and, under such predetermined conditions, one or more of the relays is effectively energized to bridge the stationary contacts 46 by means of the moving contacts 44. Upon the bridging of any one of the contacts 46 by the moving contacts 44, the winding 33, associated with the tripping mechanism of the circuit breaker 8, is effectively energized to actuate the circuit breaker 8 to its open position. This trip circuit may be traced from the negative terminal of the direct-current source 47, through stationary contacts 29 and pallet switch 26 of the circuit breaker 8, winding 33 associated with the tripping mechanism of the circuit breaker 8, stationary contacts 46 and moving contact 44 of one or more of the overcurrent relays 41, and thence to the positive terminal of the direct-current source 47. It follows, therefore, that the feeder circuit breaker 8 is actuated to its open position as a result of the effective energization of one or more of the overcurrent relays 41.

Immediately upon the actuation of the feeder circuit breaker 8 to its open position, an energizing circuit for the trip coil 39, associated with the circuit breaker 17, is completed. This energizing circuit may be traced from the negative terminal of the direct-current source 47, through stationary contacts 28 and pallet switch 24 of the circuit breaker 8, winding 39, associated with the tripping mechanism of the circuit breaker 17, stationary contacts 36 and pallet switch 34 of the circuit breaker 17, stationary contacts 56 and moving contact 59 of the deenergized relay 49, and thence to the positive terminal of the direct-current source 47. The circuit breaker 17 is actuated to its open position as a result of the energization of the trip coil 39 and the high-frequency currents are no longer applied to the feeder circuit 2.

A normally open push-button 45 is connected in parallel with the contacts 46 of relays 41 and provides means whereby the central station operator may effect the manual opening of the circuit breaker 8.

In accordance with the control of the network circuit breaker at the network or transformer end of the feeder circuit 2, the network circuit breakers are actuated to their closed positions whenever the high-frequency currents are supplied to the feeder circuit 2 from the high-frequency generator 12, and, when the circuit breaker 17 is actuated to its open position to disconnect the high-frequency generator 12 from the feeder circuit 2, the high-frequency relays at the network or transformer end of the feeder circuit 2 are effectively deenergized to open the network circuit breakers. It follows, therefore, that the feeder circuit 2 is isolated at both the network load circuit and at the source or bus 6.

Next, assuming the feeder circuit breaker 9 to be closed and the feeder circuit 3 to be supplying power to the network load circuit and the feeder circuit breaker 8 to be in its open position, the sequence of operation necessary in order to effect the connection of the feeder circuit 2 to the network load circuit is as follows.

Under such conditions, two additional relays 49 and 61 are required, together with a second push button switch 66. The relay 49 has an energizing winding 51 and is provided with stationary contacts 52, 53, 54 and 56 and moving contacts 57, 58 and 59. The relay 61 has an energizing winding 62, stationary contacts 63 and moving contacts 64. The relay 61 is also provided with a dash-pot or other time-delay means for purposes hereinafter to be explained. The central station operator closes the push button switch 66, thereby effecting the energization of the winding 51 of relay 49. The energizing circuit for this relay may be traced from the positive terminal of the direct-current source 47, through a resistance 67, push button switch 66, energizing winding 51 of the relay 49, stationary contacts 28 and pallet switch 24 of the circuit breaker 8, and thence to the negative terminal of the direct-current source 47.

The relay 49 is thereby effectively actuated to bridge the stationary contacts 52, 53 and 54 by means of the moving contacts 57, 58 and 59, respectively. At the same time, the moving contact 59 is moved out of contact with the stationary contacts 56. The bridging of the stationary contacts 52 by means of the moving contact 57 completes a holding circuit for the energizing winding 51 of the relay 49. This holding circuit may be traced from the positive terminal of the direct-current source 47, through resistance 67, stationary contacts 52 and moving contact 57 of relay 49, energizing winding 51 of relay 49, stationary contacts 28 and pallet switch 24 of the circuit breaker 8, and thence to the negative terminal of the direct-current source 47.

The bridging of the stationary contacts 53 of the relay 49 by means of the moving contact 58, results in the energization of the closing coil 38 of the circuit breaker 17. This energizing circuit may be traced from the negative terminal of the direct-current source 47, through the stationary contacts 53 and moving contact 58 of relay 49, stationary contacts 37 and pallet switch 34 of the circuit breaker 17, energizing winding 38 of the circuit breaker 17, and thence to the positive terminal of the direct-current source 47. The circuit breaker 17 is thereupon actuated to its closed position and the generator 12 supplies high-frequency currents to the feeder circuit 2.

The bridging of the stationary contacts 54 of the relay 49, by means of the moving contact 59, results in the energization of the winding 62 of relay 61. This energizing circuit may be traced from the positive terminal of the direct-current source 47, through stationary contacts 54 and moving contact 59 of relay 49, energizing winding 62 of relay 61, and thence to the negative terminal of the direct-current source 47. Inasmuch as the relay 61 is provided with a dashpot or other time-delay arrangement, the stationary contacts 63 thereof are not bridged by the moving contact 64 until a predetermined time has elapsed after the energization of the winding 62.

In the meantime, upon the application of the high-frequency currents from the generator 12 to the feeder circuit 2, the high-frequency relays, at the network load circuit end of the feeder circuit 2, are effectively energized to close their associated network circuit breakers with the result that a voltage proportional to the network load circuit voltage appears on the network transformer side of the feeder circuit breaker 8. The central station operator may then synchronize the source or bus 6 with the network load circuit by connecting a synchroscope across the open contacts of the circuit breaker 8. As soon as the magnitude and phase position of the respective bus or source voltage and network load circuit voltage are proper for effecting the closure of the feeder circuit breaker 8, the central station operator pushes the switch button arrangement 48 to energize the coil 32 associated with the closing mechanism of the feeder circuit breaker 8.

This energizing circuit may then be traced from the positive terminal of the direct-current source 47, through the push button switch 48, energizing winding 32 associated with the closing mechanism of the circuit breaker 8, stationary contacts 31 and pallet switch 26 of the circuit breaker 8, and thence to the negative terminal of the direct-current source 47. As a result, the feeder circuit breaker 8 is actuated to its closed position and power is supplied to the network load circuit from the source or bus 6 through the feeder circuit breaker 8. A predetermined time after the energization of the winding 62 of relay 61, the stationary contacts 63 thereof are bridged by the moving contact 64 and the energizing winding 51 of the relay 49 is effectively shunted with the result that relay 49 becomes deenergized and opens the circuits formerly completed through stationary contacts 52, 53 and 54. The deenergization of relay 49 effects the bridging of the stationary contacts 56 by the moving contact 59, thereby partially completing the trip circuit for the circuit breaker 17.

The opening of the circuit formerly completed across the stationary contacts 52 by the moving contact 57 interrupts the holding circuit for the energizing winding 51 of relay 49. The interruption of the circuit across the stationary contacts 53 opens one of the parallel circuits provided for the closing coil 38 of the circuit breaker 17. The opening of the circuit formerly completed across the stationary contacts 54 also opens the energizing circuit for the winding 62 of relay 61. It follows, therefore, that upon the bridging of the stationary contacts 63 by the moving contact 64 of relay 61, both the relays 49 and 61 are deenergized and return to their original or reset positions and the high-frequency generator 12 is disconnected from the feeder 2.

The time-delay in the bridging of the stationary contacts 63 by means of the moving contact 64 of relay 61, is imparted to this relay for the purpose of insuring that feeder circuit breaker 8 is actuated to its closed position by the central station operator within a reasonable time after the application of the high-frequency currents, thereby obviating the possibility of the feeder circuit breaker 8 remaining in its open position for an indefinite period when the high-frequency generator 12 is connected to the feeder circuit 2.

Assuming that relay 61 were omitted, and that the central station operator did not close the feeder circuit breaker 8 after the application of the high-frequency currents to the feeder circuit 2 by means of the closing of circuit breaker 17, it would be impossible to clear any faults which should develop on the feeder circuit 2, inasmuch as only the network circuit breakers, associated with such feeder, would be closed and no over-current would be available to effect the actuation of any of the over-current relays 41. The use of this time-delay relay, therefore, guards against the possibility of the central station operator closing the circuit breaker 17 for the purpose of applying the high-frequency currents to the feeder 2 and then for some reason being called away and thus leave the high-frequency generator 12 connected to the feeder circuit 2 for a considerable time.

Obviously, this possibility might result in serious trouble, and one reason why the time-delay relay 61 is provided is to insure that the circuit breaker 17 will be actuated to its open position within a predetermined time interval after the actuation of the push button switch 66 by the central station operator, the time-delay depending upon the setting of the relay 61 for any particular network system.

It will thus be seen that the control scheme shown in Fig. 3 of the drawings may be utilized in conjunction with any of the feeder circuits, irrespective of whether such feeder circuits are energized from the same or different sources. Briefly, in order to connect the feeder circuit 2 to a network load circuit energized from a second feeder circuit which is connected to the same source or bus as the feeder circuit 2, it is only necessary to depress the push button switch 48 to close the feeder circuit breaker 8 and apply the high-frequency current supplied from the generator 12 to the feeder circuit 2 through the circuit breaker 17. However, in the event that the network load circuit is energized from a feeder circuit other than one supplied with power from a source or bus other than the power supply for the feeder circuit 2, it is necessary for the central station operator to first actuate the push button switch 66, synchronize across the open contacts of the feeder circuit breaker 8 by any suitable means and then to actuate the push button switch 48. The same result is accomplished in either case and the feeder circuit breaker 8 is actuated to its closed position, thereby permitting normal frequency currents to be impressed on the feeder circuit 2 and the network transformers associated therewith, and also to connect the high-frequency generator 12 to the feeder circuit 2 through the circuit breaker 17.

The control schemes shown in Figs. 2 and 3 of the drawings may be modified to prevent the closing of the feeder circuit breakers 8, 9 or 11 in the event of the failure of the high-frequency current sources for any reason. Fig. 4 illustrates a modification of the control scheme illustrated in Fig. 2 of the drawings and the modified control scheme incorporates an additional high-frequency relay which functions to predetermine the operation of the feeder circuit breakers 8, 9 or 11.

The control scheme associated with the feeder circuit breaker 9 and the circuit breaker 18, associated with the high-frequency generator 13, in Fig. 4, is identical with the control scheme illustrated in Fig. 2, with the exception of incorporating the additional high-frequency relay 68 associated with the high-frequency generator 13 through a suitable tuned circuit 69. The high-frequency relay 68 is provided with an energizing winding 71, stationary contacts 72 and 73, and a moving contact 74. Under normal system conditions and when the high-frequency generator 13 is generating the high-frequency control currents, the winding 71 of relay 68 is energized to effect the bridging of stationary contacts 72 by means of the moving contact 74.

The stationary contacts 72 are included in a series circuit with the push button switch 48, the closing coil 32 associated with the feeder circuit breaker 9, and the stationary contacts 31 and pallet switch 26 of the circuit breaker 9. As long as the high-frequency generator 13 is in operating condition and is adapted to supply the high-frequency control currents to the feeder circuit 3, the energizing circuit for the winding 32, associated with the closing mechanism of feeder circuit breaker 9, is adapted to be completed through the stationary contacts 72 and moving contact 74 of the relay 68. Since the high-frequency generator 13 is adapted to run continuously, the sequence of control operation of the feeder circuit breaker 9 and the circuit breaker 18, associated with the high-frequency source 18, is the same as the sequence of operation described with reference to Fig. 2 of the drawings.

However, in the event that the high-frequency generator 13 is faulty or for some reason or other fails to deliver or generate the high-frequency control currents, the energizing winding 71, of the high-frequency relay 68, becomes de-energized and the stationary contacts 73 are bridged by the moving contact 74. The stationary contacts 73 are included in a parallel circuit with the stationary contacts 46 of the overcurrent relays 41 and upon the bridging of the contacts 73, an energizing circuit for the tripping coil 33, of the feeder circuit breaker 9, is completed when the feeder circuit breaker 9 is in its closed position. This energizing circuit may be traced from the positive terminal of the direct-current source 47, through the stationary contact 73 and moving contact 74 of relay 68, tripping coil 33, stationary contacts 29 and pallet switch 26 of the circuit breaker 9, and thence to the negative terminal of the direct-current source 47.

It follows, therefore, that the provision of the high-frequency relay 68 ensures that the feeder circuit breaker 9 will never be actuated to its closed position when the associated high-frequency generator 13 is not in condition to supply high-frequency control currents to the feeder circuit 3 and also that the feeder circuit breaker 9 will be actuated to its open position immediately upon the failure of the source of high-frequency control currents. The network circuit breakers, associated with the network load circuit end of the feeder circuit 3, are controlled by high-frequency relays responsive to the high-frequency control currents generated by the source 13 and are actuated to their open positions upon the removal or failure of the high-frequency source 13. The provision of the additional high-frequency relay 68 results in the complete isolation of the feeder circuit 3 by effecting the actuation of the feeder circuit breaker 9 to its open position upon the failure of the high-frequency source 13.

The modified control scheme, illustrated in Fig. 4, permits the connection of one or more feeder circuits to supply power to a common network load circuit; and the control scheme is so connected and arranged that any of the feeder circuits are completely isolated from the associated network load circuit in the event of fault or predetermined abnormal current conditions existing on the feeder circuit or in the event of the failure of the associated high-frequency generator or source.

The control scheme illustrated in Fig. 5 of the drawings is similar to the control scheme of Fig. 3 and incorporates the additional high-frequency relay 68 in order to provide correct breaker operation in the event of the failure of the high-frequency source 12. The stationary contacts 72, of relay 68, are included in the energizing circuit for the closing coil 32 of the feeder circuit breaker 8, and the contacts 73 of relay 68 are included in parallel circuit with the contacts 46 of the overcurrent relays 41 and are arranged to complete the energizing circuit for the trip coil 33 of the feeder circuit breaker 8. Inasmuch as the sequence of control operation for the feeder circuit breaker 8 and the circuit breaker 17, associated with the high-frequency source 12, is the same as that outlined with respect to the control scheme of Fig. 3, it is deemed unnecessary to provide a second detailed consideration of the sequence of control operation.

The function of the high-frequency relay 68 is similar to that detailed with reference to the control scheme illustrated in Fig. 4 of the drawings and is merely provided in order to prevent the closure of the feeder circuit breaker 8 when the high-frequency generator 12 is out of order or to effect the opening of the feeder circuit breaker 8 in the event of the failure of the high-frequency source 12.

The additional high-frequency relay 68, as illustrated in the Figs. 4 and 5 modifications, should not be included in the control arrangement associated with the feeder circuit breakers and the circuit breakers associated with the high-frequency sources when the associated feeder circuits are adapted to supply power to radial feeders in addition to the common network load circuit 1, as shown in Fig. 1 of the drawings. In other words, when radial loads are being supplied from one or more of the feeder circuits in addition to the common network load, the control schemes illustrated in Figs. 2 and 3 of the drawings should be utilized in preference to any other control schemes, inasmuch as the radial load should not be interrupted even in the event of a failure of the associated high-frequency sources. This preference for a control scheme, associated with the feeder circuit breakers and the circuit breakers associated with the high-frequency sources, is recommended when it is assumed that the control relays for such radial loads are not made responsive to the high-frequency control currents generated by the associated high-frequency sources.

The control scheme associated with the network circuit breakers at the network load circuit end of the respective feeder circuits will now be considered with reference to Figs. 6 and 7 of the drawings.

In Fig. 6, the relay control scheme for any of the network circuit breakers is indicated as being associated with the feeder circuit 3 which is adapted to supply power to one of the network transformers 3—T. A network circuit breakers 3—N is associated with the secondary winding of the network transformer 3—T and is adapted to connect such secondary winding with the network load circuit 1. The network circuit breaker 3—N is provided with stationary contacts 76 and 77 and pallet switches 78 and 79. The stationary contacts 76 are adapted to be bridged by the pallet switch 78 when the network circuit breaker 3—N is in its open position, and the circuit completed through such stationary contacts is adapted to be opened when the circuit breaker 3—N is actuated to its closed position. When the circuit breaker 3—N is in its closed position, the stationary contacts 77 are adapted to be bridged by the pallet switch 79. The network circuit breaker 3—N is provided with suitable closing and tripping mechanisms including a closing coil 81 and a tripping coil 82, respectively.

In order to control the actuation of the network circuit breaker 3—N, a single high-frequency relay 3—R is provided. The relay 3—R has an energizing winding 84, stationary contacts 86 and 87, and moving contacts 88 and 89. When the winding 84 of relay 3—R is deenergized, the moving contact 88 bridges the stationary contacts 86 and the moving contact 89 is moved out of engagement with the stationary contacts 87. When the winding 84 of relay 3—R is effectively energized, the contact 88 is moved out of engagement with the stationary contacts 86 and the moving contact 89 is adapted to bridge the stationary contacts 87.

As illustrated in the various figures of the drawings, the high-frequency control currents are adapted to be applied to only one phase of the illustrated three-phase system. Inasmuch as the high-frequency control currents are employed for the purpose of effecting the automatic control of the network circuit breakers, such as the circuit breaker 3—N, it is unnecessary to apply the control currents to more than one of the phases and, as shown in the drawings, the high-frequency control currents are adapted to be applied to phase A of each of the feeder circuits. However, in the event that the high-frequency control currents are adapted to be applied to all of the phases of the respective feeder circuits, it would be necessary to provide additional high-frequency relays, corresponding to the relay 3—R, and such relays would be energized from the phases B and C, respectively.

Since the control effected by the high-frequency relay 3—R is the same irrespective of the number of such high-frequency relays provided, any additional high-frequency relays would have the respective contacts thereof connected in parallel with the respective stationary contacts 86 and 87 of relay 3—R. For purposes of describing the present invention, only one high-frequency relay 3—R is deemed necessary, and any additional relays or control apparatus, such as may be required in practice, are understood as being contemplated in the scheme of control illustrated in Fig. 6.

The network circuit breaker 3—N is adapted to be controlled exclusively in accordance with the high-frequency control currents and, in accordance with such control, the circuit breaker 3—N is actuated to and maintained in its closed position only upon and during the application of the high-frequency control currents to the source or bus end of the feeder circuit 3. Upon the application of the high-frequency currents to phase A of the feeder circuit 3, the winding 84, of relay 3—R, is effectively energized to bridge the stationary contacts 87 by means of the moving contact 89. The bridging of contacts 87 completes an energizing circuit for the closing coil 81, associated with the closing mechanism of the network circuit breaker 3—N, and such energizing circuit may be traced from phase C on the network transformer side of the circuit breaker 3—N, through stationary contacts 87 and moving contact 89 of relay 3—R, energizing winding 81, stationary contacts 76 and pallet switch 78 associated with the circuit breaker 3—N, and thence to phase A on the network transformer side of the network circuit breaker 3—N.

The closing coil 81 is thereby energized in accordance with the voltage appearing across the phases A—C of the secondary winding of transformer 3—T and the circuit breaker 3—N is actuated to its closed position and is maintained in such position by a suitable mechanical latching means. The network circuit breaker 3—N is maintained in its closed position as long as the high-frequency control currents are applied to the feeder circuit 3, and the winding 84 of the high-frequency relay 3—R remains effectively energized to maintain the moving contact 88 out of engagement with the stationary contacts 86.

Upon the occurrence of a fault on the feeder circuit 3 or in the network transformer 3—T, the associated high-frequency generator is disconnected and the removal of the high-frequency control currents results in the deenergization of the winding 84 of relay 3—R. The deenergization of relay 3—R results in the bridging of stationary contacts 86 by means of the moving contact 88 to thereby complete an energizing circuit for the tripping coil 82 of the circuit breaker 3—N. This energizing circuit may be traced from phase C on the network transformer side of the network circuit breaker 3—N, through stationary contacts 86 and moving contact 88 of relay 3—R, stationary contacts 77 and pallet switch 79 associated with the circuit breaker 3—N, tripping coil 82, and thence to phase A on the network transformer side of the network circuit breaker 3—N. The circuit breaker 3—N is thereupon actuated to its open position and the network transformer 3—T is disconnected from the network load circuit 1.

The high-frequency relay 3—R is also deenergized in the event of the failure of the high-frequency source associated with the feeder circuit 3, and the network circuit breaker 3—N is actuated to its open position as described above.

It may be noted that the energizing voltage for both the closing and tripping windings 81 and 82, respectively, is obtained across the phases A—C on the secondary side of the network transformer 3—T, and it is, therefore, necessary for the feeder circuit breaker, associated with the feeder circuit 3, to be in its closed position before the network circuit breaker 3—N may be actuated to its closed position. However, when the network load circuit 1 is energized and the high frequency relay 3—R becomes deenergized, the network transformer is energized from the network load circuit 1 and network potential is available for tripping the breaker 3—N. In the event that the relay 3—R becomes deenergized and the network load circuit is also deenergized, the breaker 3—N will remain in its closed position until the network is energized from another feeder. This condition does not present any difficulties since the feeder circuit 3 is isolated from its associated source or bus and the network is deenergized.

The control scheme shown in Fig. 6 should only be utilized when the feeder circuits supplying power to a common network load circuit are energized from the same source or bus and when it is unnecessary to synchronize any incoming feeders with any feeders which are connected and arranged to supply power to the common network load circuit.

When feeder circuits energized from different sources or buses are arranged to be connected to a common network load circuit, the control scheme illustrated in Fig. 7 of the drawings should be utilized in order to permit a synchronizing between the network load circuit voltage and the voltage of the bus or source associated with the incoming feeder circuit. The control scheme of Fig. 7 utilizes a voltage relay 91, in addition to the high-frequency relay 3—R, and the relay 91 functions to permit the closure of a network circuit breaker irrespective of the energized or deenergized condition of the associated feeder circuit when the network load circuit is energized. In other words the relay 91 may be termed a transfer relay and is effective to provide the network transformer potential or the network load circuit potential for proper voltage control depending on whether the network load circuit is deenergized or energized. The provision of relay 91 permits the network circuit breaker 3—N to be actuated to its closed position when the network is energized and it is desired to synchronize the incoming feeder 3 with the network.

The high-frequency relay 3—R is provided with an energizing winding 84, stationary contacts 86 and 87, and moving contact 88. When the relay 3—R is deenergized, the stationary contacts 87 are adapted to be bridged by the moving contact 88 and, when the relay 3—R is effectively energized, the stationary contacts 86 are adapted to be bridged by the moving contact 88. The energizing winding 84 of the high-frequency relay 3—R is adapted to be energized only in accordance with the high-frequency currents impressed upon phase A of the feeder circuit 2 and the tuned circuit 2—C is provided in order to permit such other-than-normal frequency energization.

The voltage-responsive relay 91 is provided with an energizing winding 92, stationary contacts 93, 94, 96 and 97 and moving contacts 98 and 99. When the winding 92 is deenergized, the stationary contacts 94 and 97 are adapted to be bridged by the moving contacts 98 and 99, respectively. When the winding 92 is effectively energized, the stationary contacts 93 and 96 are adapted to be bridged by the moving contacts 98 and 99, respectively. The control arrangement associated with the network circuit breaker 2—N is identical to the control arrangement illustrated in conjunction with the network circuit breaker 3—N in Fig. 6 of the drawings.

Since the control scheme of Fig. 7 is to be utilized when the network load circuit 1 is adapted to be energized by feeders connected to different sources or buses, the relay control means is illustrated as being associated with the network circuit breaker 2—N, network transformer 2—T and feeder circuit 2. A second feeder circuit 3 is also illustrated and is adapted to supply power to the common network load circuit 1 through a network transformer 3—T and network circuit breaker 3—N. The relay control apparatus for feeder 3 is the same as that illustrated for feeder 2 and is not shown in the drawings for the purpose of simplification.

Assuming the network load circuit 1 to be deenergized, the network circuit breakers 2—N and 3—N to be in their open positions, and the feeder circuits 2 and 3 to be the only feeder circuits adapted to supply power to the network load circuit 1, the sequence of control operation when it is desired to connect the transformer 2—T to the network load circuit 1 will now be considered.

Under such conditions, the network load circuit 1 is deenergized and the energizing winding 92 of relay 91 is deenergized, inasmuch as the terminals of this winding are connected across the phases A—C on the network load circuit side of the network circuit breaker 2—N.

The central station operator closes the feeder circuit breaker, associated with the feeder circuit 2, thereby energizing the network transformer 2—T. Immediately upon the closure of the feeder circuit breaker, the high-frequency currents are superimposed upon the feeder circuit 2 with the result that the winding 84 of relay 2—R is effectively energized to bridge the stationary contacts 86 by means of the moving contact 88. The bridging of stationary contacts 86 completes a circuit for energizing the closing coil 81 associated with the closing mechanism of the network circuit breaker 2—N. This energizing circuit may be traced from phase A on the network transformer side of the network circuit breaker 2—N, through the stationary contacts 97 and moving contact 99 of relay 91, stationary contacts 76 and pallet switch 78 of the circuit breaker 2—N, energizing winding 81, stationary contacts 86 and moving contact 88 of relay 2—R, stationary contacts 94 and moving contact 98 of relay 91, and thence to phase C on the network transformer side of the network circuit breaker 2—N.

The network circuit breaker 2—N is thereupon actuated to its closed position and the feeder circuit 2 is connected to supply power to the network load circuit 1 through the network transformer 2—T. The closure of the network circuit breaker 2—N energizes the network load circuit 1 and also energizes the voltage-responsive relay 91, thereby effecting the bridging of the stationary contacts 93 and 96 thereof by means of the moving contacts 98 and 99, respectively.

Assuming a fault condition to occur on the feeder circuit 2 or in the network transformer 2—T, the winding 84 of relay 2—R is deenergized due to the tripping of the feeder circuit breaker and the consequent removal of the high frequency currents with the result that the stationary contacts 87 thereof are bridged by the moving contact 88. This actuation of relay 2—R completes a circuit for the tripping coil 82 associated with the tripping mechanism of the network circuit breaker 2—N, however, the network circuit breaker 2—N is not actuated to its open position due to the absence of potential on both the feeder circuit and the network load circuit.

However, when the network load circuit 1 is energized from any other feeder or associated network transformers, such as the feeder circuit 3 and one or more of its associated network transformers 3—T and a fault occurs on the feeder circuit 2 or in the network transformer 2—T, the winding 92 of the voltage-responsive relay 91 is effectively energized in accordance with the voltage appearing across the phases A—C on the network load circuit side of the network circuit breaker 2—N and an energizing circuit is completed for the tripping coil 82 of the network circuit breaker 2—N. This tripping circuit may be traced from phase A on the network load circuit side of the network circuit breaker 2—N, through stationary contacts 96 and moving contact 99 of relay 91, tripping coil 82, stationary contacts 77 and pallet switch 79 associated with the network circuit breaker 2—N, stationary contacts 87 and moving contact 88 of relay 2—R, stationary contacts 93 and moving contact 98 of relay 91, and thence to phase C on the network load circuit side of the network circuit breaker 2—N. The network circuit breaker 2—N is thereupon actuated to its open position to completely isolate the feeder circuit 2 from the network load circuit 1 and its associated source or bus.

Next, assume that the network circuit breaker 3—N is in its closed position and that the network load circuit 1 is energized by the feeder circuit 3 through one or more of its associated network transformers 3—T and network circuit breakers 3—N, and that the network circuit breaker 2—N is in its open position and the network transformer 2—T is completely deenergized. The sequence of control operation required for connecting the additional network transformer 2—T to supply power to the network load circuit 1 may be explained as follows.

The central station operator applies the high-frequency control currents to the feeder circuit 2 from the high-frequency generator associated with such feeder circuit with the result that the winding 84, of the high-frequency relay 2—R, is effectively energized to cause the bridging of stationary contacts 86 by means of the moving contact 88. The bridging of stationary contacts 86 completes an energizing circuit for the closing coil 81 associated with the network circuit breaker 2—N. This energizing circuit may be traced from phase A on the network load circuit side of the network circuit breaker 2—N, through stationary contacts 96 and moving contact 99 of the energized relay 91, stationary contacts 76 and pallet switch 78 of the network circuit breaker 2—N, energizing winding 81, stationary contacts 86 and moving contact 88 of relay 2—R, stationary contacts 93 and moving contact 98 of relay 91, and thence to phase C on the network load circuit side of the network circuit breaker 2—N.

The network circuit breaker 2—N is actuated to its closed position upon the effective energization of the closing coil 81 and a voltage proportional to the network load circuit voltage appears on the network transformer side of the feeder circuit breaker associated with the feeder circuit 2. The central station operator then synchronizes this voltage with the source or bus voltage appearing on the source or bus side of the feeder circuit breaker and, when the two voltages bear a predetermined permissible magnitude and phase angle relation, the feeder circuit breaker is actuated to its closed position and the source or bus associated with the feeder circuit 2 is synchronized through the network load circuit 1 with the source or bus supplying power to the feeder circuit 3.

The control scheme, as illustrated in Fig. 7, provides means for automatically controlling the opening and closing of the network circuit breaker 2—N in accordance with any system conditions. It is obvious that the circuit breaker 2—N is closed and maintained in its closed position as long as the high-frequency control currents are applied to the feeder circuit 2 and the network circuit breaker 2—N is actuated to its open position whenever the superimposed control frequency currents are removed from the feeder circuit 2 providing normal frequency potential is present on either or both sides of the network circuit breaker 2—N under such conditions. This function of the control scheme associated with the network circuit breaker 2—N permits the absolute control of such circuit breaker by the central station operator and the number of relays required in this control scheme is reduced to a minimum, thereby avoiding objections respecting installation and maintenance cost of the network transformer and network circuit breaker unit installations.

The foregoing description of the control schemes and sequence of operation attainable by the use of the present invention, as applied to alternating-current systems of distribution, clearly indicates the simplified nature of such control schemes and the possibility of dependable and advantageous supervision of all of the relay control schemes by the central station operator.

In view of the basic nature of the present invention and because of the applicability of the proposed control schemes to all existing and contemplated alternating-current systems of distribution, no restrictions should be placed thereon other than as indicated in the appended claims.

I claim as my invention:

1. In an alternating-current system of distribution including a supply circuit, a circuit breaker therein, a load circuit, and a circuit interrupter connecting said circuits, the combination including a source of other-than-normal frequency currents arranged to be connected with said supply circuit, means associated with said source and operable to connect said source to said supply circuit when the circuit breaker is in its open position, and additional means responsive to the closing of said circuit breaker for connecting the source of said supply circuit.

2. In an alternating-current system of distribution including a supply circuit, a circuit breaker therein, a load circuit, a circuit interrupter connecting said circuits and control means for said circuit interrupter, the combination including a source of other-than-normal frequency currents, a breaker connecting said source and said supply circuit, means for closing said breaker when said circuit breaker is open, additional means responsive to the closing of said circuit breaker for closing said breaker and means responsive to the opening of said circuit breaker for opening said breaker.

3. In an alternating-current system of distribution including a load circuit, a supply circuit, a circuit breaker in said supply circuit, a distribution transformer in said supply circuit and a load circuit breaker connecting said transformer to said load circuit, the combination including a source of other-than-normal frequency currents, a circuit interrupter connecting said source with one of said circuits, relay means associated with said supply circuit and said circuit breaker for effecting the opening of said circuit breaker, means responsive to the opening of said circuit breaker for opening said circuit interrupter, and control means associated with said load circuit breaker and arranged to be energized in accordance with said other-than-normal frequency currents, said load circuit breaker being arranged to be automatically opened by said control means upon the opening of said circuit interrupter.

4. In an alternating-current system of distribution including a supply circuit, a circuit breaker therein, a load circuit, and a load circuit breaker connecting said circuits, the combination including a source of other-than-normal frequency currents, a circuit interrupter connecting said source with said supply circuit, relay means associated with said supply circuit and arranged to open said circuit breaker under predetermined conditions on said supply circuit, control means including a time-delay relay for closing said circuit interrupter when said circuit breaker is open and for opening said circuit interrupter when said circuit breaker remains open for a predetermined time and means controlled by said circuit breaker for automatically opening said circuit interrupter upon the opening of said circuit breaker.

5. In an alternating-current system of distribution including a network load circuit, a supply circuit, a circuit breaker in said supply circuit, a distribution transformer energized by said supply circuit and a network switch between said transformer and said network load circuit, the combination including a source of other-than-normal frequency currents, a circuit interrupter connecting said source with said supply circuit, means for restricting the source currents to said supply circuit, relay control means responsive to said source currents for automatically controlling the actuation of said network switch, means for closing said circuit interrupter when said circuit breaker is open and means controlled by said circuit breaker for closing and opening said circuit interrupter when said circuit breaker is closed or opened, respectively.

6. In an alternating-current system of distribution including a central station, a plurality of supply circuits, a circuit breaker in each supply circuit, a transformer in each supply circuit, a common network load circuit and a network switch connecting each transformer with said network load circuit, the combination including a source of other-than-normal frequency currents, a circuit interrupter connecting said source and one or more of said supply circuits, means for restricting said source currents to said supply circuits, relay control means responsive to the source currents and arranged to effect the automatic actuation of said network switches, overcurrent relay means energized from said supply circuits and arranged to control the opening of said circuit breakers under predetermined current conditions, means controlled by the actuation of said circuit breaker for automatically controlling the closing and opening of said circuit interrupter and additional means for closing said circuit interrupter when said circuit breaker is open for the purpose of synchronizing an incoming supply circuit with the network load circuit.

7. In an alternating-current system of distribution including a plurality of sources, a plurality of supply circuits, circuit breakers connecting said supply circuits to said sources, a common network load circuit and a network switch for connecting each of said supply circuits with said load circuit, the combination including a source of other-than-normal frequency currents, means including a circuit interrupter for superimposing the source currents on the supply circuits, control means responsive to the source currents and arranged to automatically control the closing and opening of each network switch, and means for closing said circuit interrupter when the associated supply circuit is deenergized for the purpose of synchronizing the network load circuit and the source associated with the said deenergized supply circuit.

8. In an alternating-current system of distribution including a supply circuit, a load circuit and a circuit breaker connecting said circuits, the combination including a source of other-than-normal frequency currents, a circuit interrupter connecting said source with one of said circuits, relay means connected to said one of said circuits and arranged to be energized only by the source currents, said relay means being operative to close said circuit breaker when said circuit interrupter is closed and to open said circuit breaker when said circuit interrupter is open and means for independently controlling the actuation of said circuit interrupter.

9. In an alternating-current system of distribution including a supply circuit, a load circuit and a circuit breaker connecting said circuits, the combination including a source of other-than-normal frequency currents, a circuit interrupter connecting said source with one of said circuits, means for closing and opening said circuit interrupter under predetermined system conditions and control means for said circuit breaker including relay means responsive to the source currents and arranged to automatically close and open said circuit breaker and transfer relay means cooperating with said relay means for transferring the energizing connections of said control means from the load circuit to the supply circuit when the load circuit is deenergized.

10. In an alternating-current network system of distribution, a network load circuit, a plurality of sources, a plurality of feeders for transmitting power from said sources to said load circuit, a feeder circuit breaker in each of said feeders including a selected feeder circuit breaker in a selected one of said feeders, a network switch between said selected circuit breaker and said load circuit, means effective when said selected feeder circuit breaker is closed for superimposing other-than-normal frequency control currents upon said selected feeder, means responsive to said control currents for maintaining said network switch closed while said selected feeder is energized by said control currents and for causing said network switch to open when said selected feeder is free of said control currents, and means for superimposing control currents of said other-than-normal frequency upon said selected feeder when said selected feeder circuit breaker is open.

11. In an alternating-current distribution system, a load circuit, a feeder circuit for supplying power to said load circuit, feeder switching means in said feeder circuit near the supply end thereof, a source of other-than-normal frequency control currents associated with said feeder circuit, a circuit breaker in said feeder circuit between said switching means and said load circuit, control apparatus for said circuit breaker including means responsive to said control currents, and means for preventing closure of said switching means when said source is in a predetermined ineffective condition.

12. In an alternating-current distribution system, a load circuit, a feeder circuit for supplying power to said load circuit, a feeder circuit breaker in said feeder circuit near the supply end thereof, a source of other-than-normal frequency control currents associated with said feeder circuit, a second circuit breaker in said feeder circuit between said feeder circuit-breaker and said load circuit, control apparatus for said second circuit breaker including means responsive to said control currents, and means operable when said feeder circuit breaker is closed and said source is in a predetermined ineffective condition for causing said feeder circuit breaker to open.

13. In an alternating-current distribution system, a load circuit, a feeder circuit for supplying power to said load circuit, a feeder circuit breaker in said feeder circuit near the supply end thereof, a source of other-than-normal frequency control currents associated with said feeder circuit, a second circuit breaker in said feeder circuit between said feeder circuit breaker and said load circuit, control apparatus for said second circuit breaker including means responsive to said control currents, and means operable when said source is in a predetermined ineffective condition for causing said feeder circuit breaker to open if closed and for preventing closure of said feeder circuit breaker if open.

JOHN S. PARSONS.